Sept. 23, 1924.  J. SCHMITT  1,509,264
COOKING UTENSIL
Filed Nov. 14, 1919   2 Sheets-Sheet 1
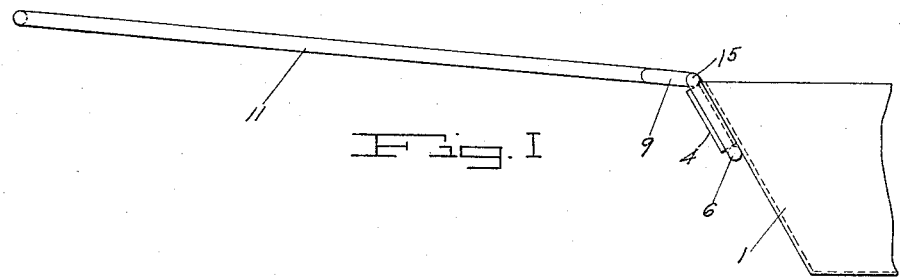
Fig. I
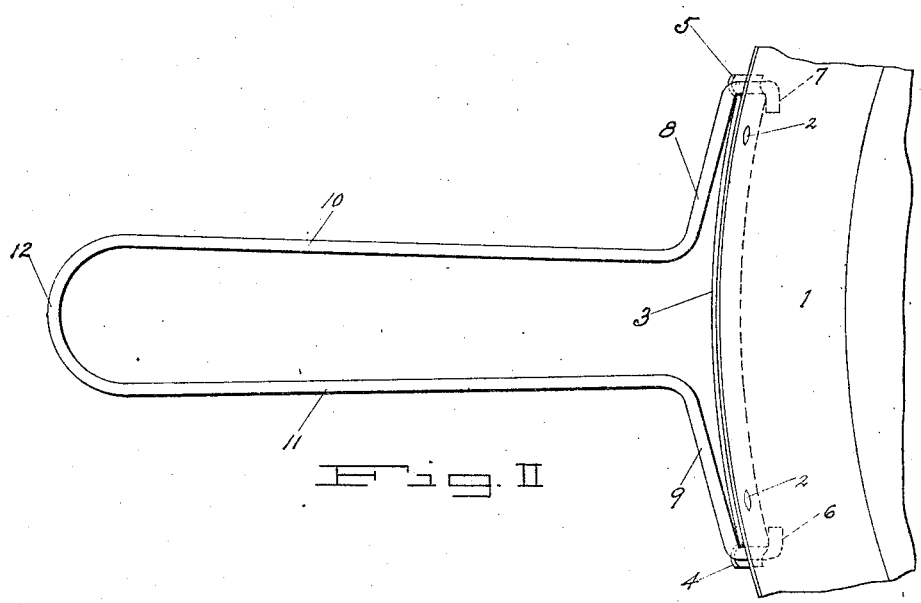
Fig. II
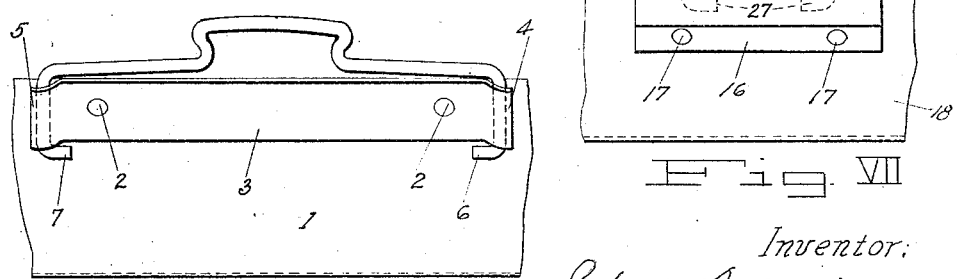
Fig. III
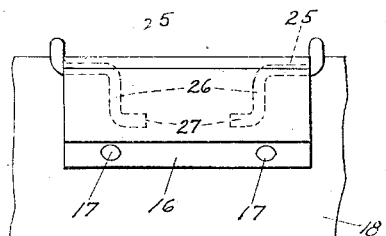
Fig. VII
Inventor:
John Schmitt
By
Joseph T. Atkins,
Attorney.

Sept. 23, 1924.
J. SCHMITT
COOKING UTENSIL
Filed Nov. 14, 1919
2 Sheets-Sheet 2
1,509,264
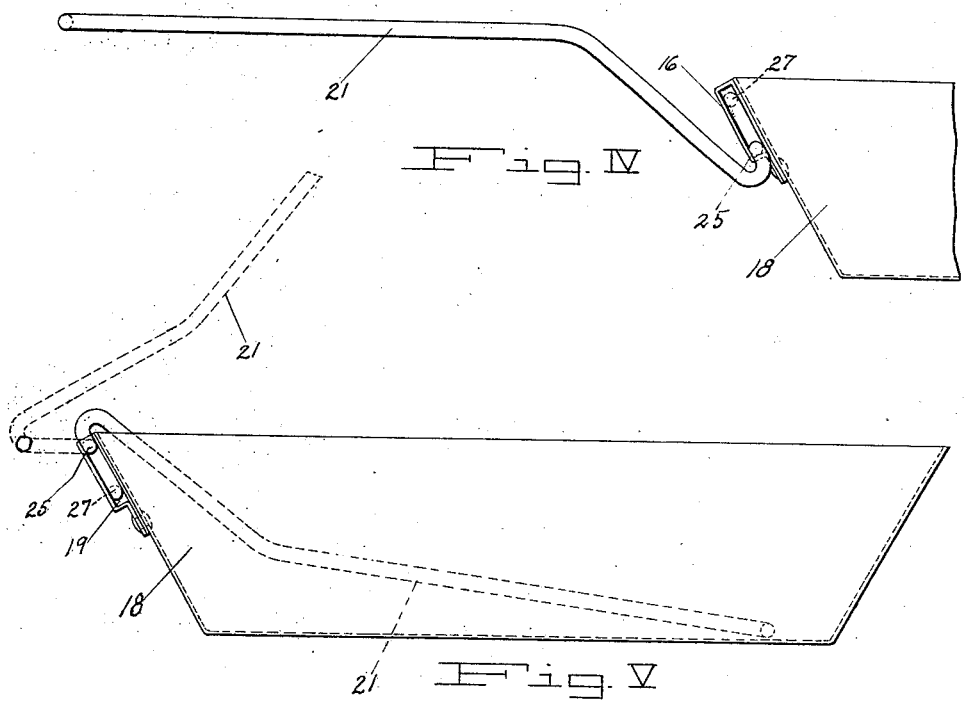
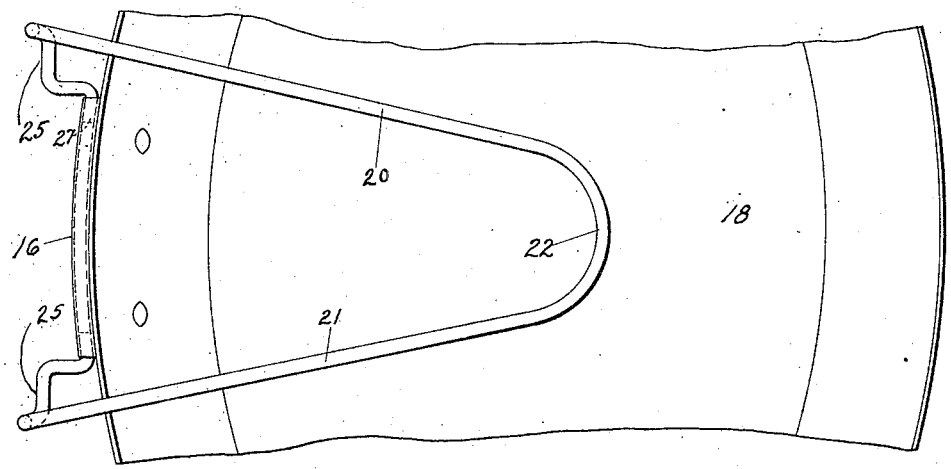

Patented Sept. 23, 1924.

1,509,264

UNITED STATES PATENT OFFICE.

JOHN SCHMITT, OF PORTLAND, OREGON.

COOKING UTENSIL.

Application filed November 14, 1919. Serial No. 338,026.

*To all whom it may concern:*

Be it known that I, JOHN SCHMITT, a citizen of the United States of America, and resident of city of Portland, in the county of Multnomah, in the State of Oregon, have invented certain new and useful Improvements in Cooking Utensils, of which the following is a specification, reference being had to the accompanying drawings.

My invention relates to cooking utensils and has for its object the production of a separable handle for a utensil for lifting it to and from the fire, and preferably including means for folding such a handle within the utensil out of the way when the utensil is packed for transportation.

My utensil is specially designed for use in a camping outfit or wherever a saving of space in packing is a matter for consideration.

What constitutes my invention will be hereinafter specified in detail and succinctly set forth in the appended claims.

In the accompanying drawings,

Figure I is a side elevation of a portion of a frying pan with a handle in one form of embodiment of my invention affixed thereto.

Figure II is a top plan view of the subject matter of Figure I.

Figure III is a side elevation of the subject matter of Figure II looking at it from the free end of the handle.

Figure IV is a view similar to Figure I, showing a modification of my invention.

Figure V is a side elevation of a frying pan complete, showing the handle illustrated in Figure IV in two positions, in full and dotted lines in folded position and in dotted lines in raised position, respectively. In full and dotted lines, the handle is shown as folded within the hollow of the pan behind whose side wall it is shown in dotted lines. In the unobscured dotted position of the handle it is partially broken away and lifted out of the hollow of the pan towards the position in which it is illustrated in Figure IV.

Figure VI is a top plan view of the subject matter of Figure V, showing the handle in the position illustrated by dotted lines in that figure, and showing the pan in fragmental plan.

Figure VII is a view similar to Figure III, showing the position of the pan-engaging end of the handle when it is folded within the pan, as shown in Figure V.

Referring to the numerals on the drawings, 1 indicates a frying pan, which is selected by way of example of any cooking utensil. To the side of the pan 1, near its upper edge, is secured, as by rivets 2, a cleat 3. In its simplest form of embodiment, the cleat may be provided with terminal open jaws 4 and 5 of sufficient extent to accommodate, respectively, the bent ends 6 and 7 of a handle. Extensions 8 and 9 of legs 10 and 11, respectively, carry said ends 6 and 7, the legs being united by a spring bend 12, whose resiliency tends to close them and thereby to bring the ends 6 and 7 together. An inclination at 15 between the respective ends 6 and 7 and their respective extensions 8 and 9, gives to the handle when applied to the pan, the inclination desired, as shown in Figure I. As shown in that position the ends 6 and 7 engage the jaws 4 and 5 respectively, and by the force of the spring 12 serve to positively unite the handle to the pan with rigidity sufficient for all practical purposes.

In the form of embodiment of my invention above described, the handle is, at will, attachable to or entirely separable from the pan. In the remaining figures of the drawings, a slight form of modification is shown in which provision is made for pivotally uniting the pan and its handle so that the handle, although detachable from the pan, may be kept united to it and folded into it as occasion for transportation may require.

In the modified form of my invention, instead of the cleat 3, I employ a modified cleat 16 secured as by rivets 17 to the pan designated, for distinction only, by the numeral 18. The modified cleat embodies a transverse recess 19 extending, it may be, from end to end through it and defining a slot open at the opposite extremities of said cleat. The said slot is adapted to fulfill the function of the jaws 4 and 5, and also to lend itself to the forming of a pivotal connection between the handle and the pan.

In the figures under present consideration the handle is shown as provided with a pair of legs 20 and 21 united by a resilient bend 22. Each leg terminates in an oppositely disposed terminal, each comprising an inturned portion 25, a brace portion 26, and a pivot tip 27. A comparison of Figures VI and VII with Figure V will serve to show the contours of parts of the handle and their relative arrangement, one towards another.

If the disposition of the members 25 of the handle be at the upper side of the recess 19, the recess being transversely elongated, as shown in Figures V and VII, for example, the position of the handle resulting therefrom will be that shown in full lines in Figure V. If, on the contrary, the position of the handle be that illustrated in Figure IV, which is the service position, the members 25 will be in the bottom of the recess 19. In either of the positions last referred to, the members 26 serve to hold the handle in position until the legs 20 and 21 of the handle are spread apart sufficiently to allow the pivot tips 27 to come into play as pivots within the recess 19. Under such conditions, the handle may be turned upon the pivots 27 to either one of two positions, namely, the position in full lines in Figure V, to which Figure VII conforms, or to the position shown in Figure IV. In either of those two positions the resiliency of the bend 22 forcibly urges the ends of the legs 20 and 21 towards each other, and drives the members 26 into the recess 19, as shown in Fig. VII, so as to hold the handle in place until released by a spreading of the legs 20 and 21 against the force of the spring 22 which unites them.

In operation, the legs of the handle may be sprung apart and applied, as provision may require, to the cleat 3 or the modified cleat 16, which the spring bend 12 or 22, upon release, will cause the handle to engage and hold.

The foregoing description of operation applies equally to both handles. The handle comprising the legs 10 and 11, is, in service, simply applied to or separated from its pan 1.

The modified form of handle may be applied to or separated from its pan 18 in the same manner, but by its modification, complete separation of the pan from its handle is rendered unnecessary since the presence of the pivot tips 27 affords means for turning it into the folded position shown in Figure V, or into the service position shown in Figure IV. In either of these two positions, as has been stated, the resiliency of the bend 22 serves to drive the ends of the legs 20 and 21 towards each other and thereby to engage and hold the handle within the recess of its modified cleat 16, for example the recess 19.

What I claim is:

1. The combination with a cooking utensil, of two jaws opening in opposite directions provided upon the exterior of said utensil, a detachable handle comprising a pair of legs united one to the other with resilient closing effect, and jaw-engaging members consisting of bent ends formed upon the ends of said legs respectively, and united to said legs by inclinations so as to give support to the utensil in jaw-engaging assemblage.

2. The combination with a cooking utensil provided upon one side with a transverse slot open at its opposite ends, of a handle comprising a pair of legs united one to the other with resilient closing effect, and slot-engaging members consisting of bent ends comprising an inturned portion, a brace portion, and a pivot-tip, substantially as and for the purpose specified.

In testimony whereof, I have hereunto set my hand in the presence of two subscribing witnesses.

JOHN SCHMITT.

Witnesses:
JOSEPH L. ATKINS,
JOHN B. CLELAND.